US011067843B2

(12) United States Patent
Okada et al.

(10) Patent No.: US 11,067,843 B2
(45) Date of Patent: Jul. 20, 2021

(54) DISPLAY DEVICE FOR HEAD-MOUNTED DISPLAY, AND HEAD-MOUNTED DISPLAY

(71) Applicant: SHARP KABUSHIKI KAISHA, Sakai (JP)

(72) Inventors: Kuniaki Okada, Sakai (JP); Hiromi Katoh, Sakai (JP); Keisuke Yoshida, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/834,279

(22) Filed: Mar. 30, 2020

(65) Prior Publication Data
US 2020/0319499 A1    Oct. 8, 2020

Related U.S. Application Data

(60) Provisional application No. 62/828,722, filed on Apr. 3, 2019.

(51) Int. Cl.
*G02F 1/1335* (2006.01)
*G02F 1/1339* (2006.01)
*G02F 1/1333* (2006.01)
*G06F 1/16* (2006.01)

(52) U.S. Cl.
CPC .... *G02F 1/133512* (2013.01); *G02F 1/13336* (2013.01); *G02F 1/13394* (2013.01); *G06F 1/163* (2013.01)

(58) Field of Classification Search
None
See application file for complete search history.

(56) References Cited

U.S. PATENT DOCUMENTS

| | | | | |
|---|---|---|---|---|
| 5,767,924 A | * | 6/1998 | Hiroki | G09G 3/36 348/749 |
| 6,040,888 A | * | 3/2000 | Masami | G02F 1/13394 348/E9.027 |
| 6,215,532 B1 | * | 4/2001 | Takagi | G02B 27/0101 345/7 |
| 6,454,416 B2 | * | 9/2002 | Aoto | H04N 9/3105 353/31 |
| 6,642,987 B2 | * | 11/2003 | Chung | G02F 1/13394 349/113 |
| 2009/0147177 A1 | * | 6/2009 | Lee | H01L 27/3293 349/61 |
| 2013/0342795 A1 | | 12/2013 | Park et al. | |
| 2016/0202531 A1 | | 7/2016 | Park et al. | |

FOREIGN PATENT DOCUMENTS

JP   2014-002385 A   1/2014

* cited by examiner

*Primary Examiner* — Edward J Glick
*Assistant Examiner* — David Y Chung
(74) *Attorney, Agent, or Firm* — ScienBiziP, P.C.

(57) ABSTRACT

A display device for a head-mounted display includes a first display panel and a second display panel that are arranged in parallel. The first display panel and second display panel each include a pair of substrates having a plane sectioned into a display region and a non-display region, and a columnar spacer interposed between the substrates. The substrate includes a spacer lightproof portion placed over the spacer. The first display panel and second display panel do not coincide with each other with regard to a location where the spacer lightproof portion in the display region is disposed.

9 Claims, 9 Drawing Sheets

DISPLAY DEVICE FOR HEAD-MOUNTED DISPLAY, AND HEAD-MOUNTED DISPLAY

TECHNICAL FIELD

The present invention relates to a display device for a head-mounted display and a head-mounted display.

BACKGROUND ART

A conventional liquid crystal panel, a main component of a liquid crystal display, includes a liquid crystal layer filled between a pair of the substrates. Disposed between the substrates are columnar spacers extending through the liquid crystal layer. The spacers keep the interval between the substrates, that is, a cell gap (i.e., the thickness of the liquid crystal layer), constant throughout the plane. In order to avoid light leakage from the locations where the spacers are disposed, it is known that lightproof portions are formed in the locations where the spacers are disposed (hereinafter referred to as spacer lightproof portions). Patent Literature 1 discloses an example of this known technique.

The liquid crystal display described in Patent Literature 1 includes lightproof portions of the same size as the spacer lightproof portions. These lightproof portions are provided for pixels where no spacers are placed (i.e., pixels without spacers), thereby making the spacer lightproof portions less visible. A smaller pixel size of the liquid crystal panel typically equates with a larger area of the spacer lightproof portion relative to the pixel, thus increasing the difference in aperture ratio between a pixel with spacers and the pixel without spacers. For this reason, the spacer lightproof portions tend to be visible. Hence, for use in a head-mounted display (HMI)) that is to be mounted to cover the eyes of a user, thus allowing the user to view an enlarged image (i.e., virtual image), the pixel size is smaller than that for other uses, such as a smartphone; thus, the spacer lightproof portions particularly need to be invisible.

CITATION LIST

Patent Literature

Patent Literature 1: Japanese Patent Application Laid-Open No. 2014-2385

SUMMARY OF INVENTION

Technical Problem

Unfortunately, if such lightproof portions as large as the spacer lightproof portions are provided for the pixels without spacers in this way, the aperture ratio of the entire liquid crystal panel decreases, thus lowering light transmittance. As a result, the brightness of the liquid crystal display degrades. Moreover, increasing the amount of light emission of a light source (e.g., LED) in order to avoid brightness degradation involves an increase in the power consumption of the LED.

Based on these problems, it is an object of the present invention to make a lightproof portion, disposed in a location where a spacer is disposed, less visible, enhance brightness, and prevent increase in power consumption.

Solution to Problem (1) A preferred embodiment of the present invention provides a display device for a head-mounted display. The display device includes a first display panel and a second display panel that are arranged in parallel. Each of the first display panel and the second display panel includes the following: a pair of substrates having a plane sectioned into a display region and a non-display region; and a spacer interposed between the pair of substrates, the spacer being columnar. The pair of substrates includes a spacer lightproof portion placed over the spacer. The first display panel and the second display panel do not coincide with each other with regard to a location where the spacer lightproof portion in the display region is disposed.

(2) In another preferred embodiment of the present invention, the display device is configured, in addition to item (1), such that the second display panel is disposed in parallel to the first display panel so as to coincide with the first display panel flipped vertically or horizontally.

(3) In still another preferred embodiment of the present invention, the display device is configured, in addition to item (1), such that the first display panel and the second display panel coincide with each other with regard to the location where the spacer lightproof portion in the pair of substrates is disposed. The display device is also configured such that at least one of the first display panel and the second display panel includes a display pixel whose lighting state is adjusted in such a manner that the first display panel and the second display panel do not coincide with each other with regard to a range of the display region in the pair of substrates.

(4) In yet another preferred embodiment of the present invention, the display device is configured, in addition to item (3), such that the lighting state of the display pixel is adjusted in both of the first display panel and the second display panel in such a manner that the first display panel and the second display panel do not coincide with each other with regard to the range of the display region in the pair of substrates.

(5) In further another preferred embodiment of the present invention, the display device is configured, in addition to item (3) or (4), such that the display pixel includes a dummy pixel whose lighting state is in always-off state.

(6) In still yet another preferred embodiment of the present invention, the display device is configured, in addition to item (1), such that the first display panel and the second display panel do not coincide with each other with regard to the location where the spacer lightproof portion in the pair of substrates is disposed.

(7) In still further another preferred embodiment of the present invention, the display device is configured, in addition to any of items (1) and (3) to (6), such that the pair of substrates includes a terminal for external connection, and that the first display panel and the second display panel are arranged in parallel in such a manner that the terminal in the first display panel and the terminal in the second display panel are adjacent to each other.

(8) in still yet further another preferred embodiment of the present invention, the display device is configured, in addition to any of items (1) to (7), such that the pair of substrates sandwiches and supports a liquid crystal layer.

(9) A still further another preferred embodiment of the present invention provides a head-mounted display that includes a head-mounted instrument to be mounted onto the head of a user. The head-mounted instrument includes the display device according to any of item (1) to (8), a first lens that forms an image displayed on the first display panel onto an eye of the user, and a second lens that forms an image displayed on the second display panel onto an eye of the user.

Advantageous Effect of Invention

The present invention makes the lightproof portion, disposed in the location where the spacer is disposed, less visible, enhances brightness, and prevents increase in power consumption.

DESCRIPTION OF PREFERRED EMBODIMENTS

First Preferred Embodiment

A first preferred embodiment of the present invention will be described with reference to FIGS. 1 to 5. The present preferred embodiment describes, by way of example, a head-mounted display HMD in the form of goggles, and a liquid crystal display 10 (i.e., an example of a display device) that is used for the head-mounted display HMD. There are an X-axis, Y-axis, and Z-axis shown in some of the drawings. Each axis indicates the same direction throughout these drawings.

Figure 1:
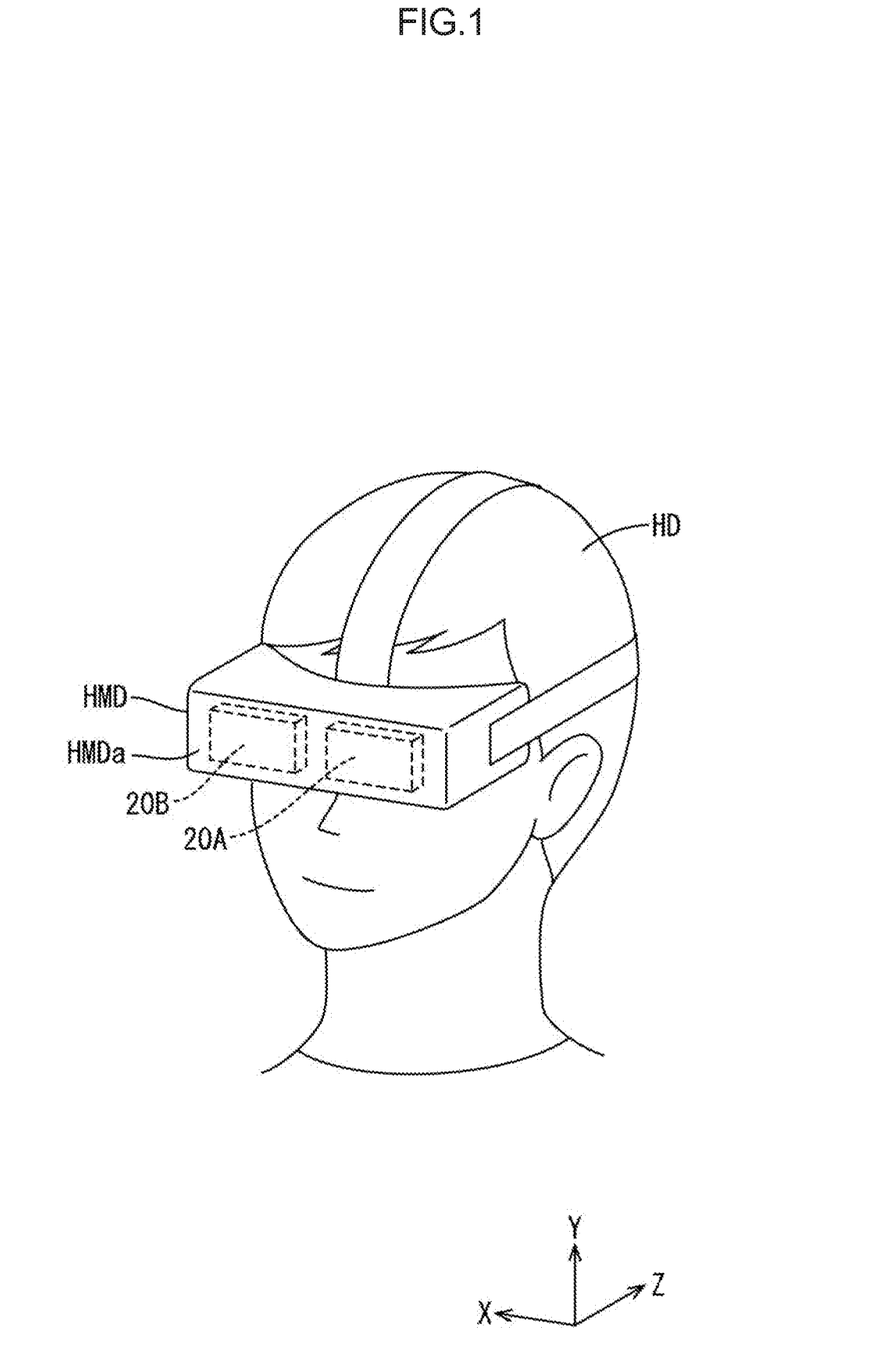
FIG. 1 is a perspective view of the head of a user wearing a head-mounted display according to a first preferred embodiment of the present invention.
Figure 2:
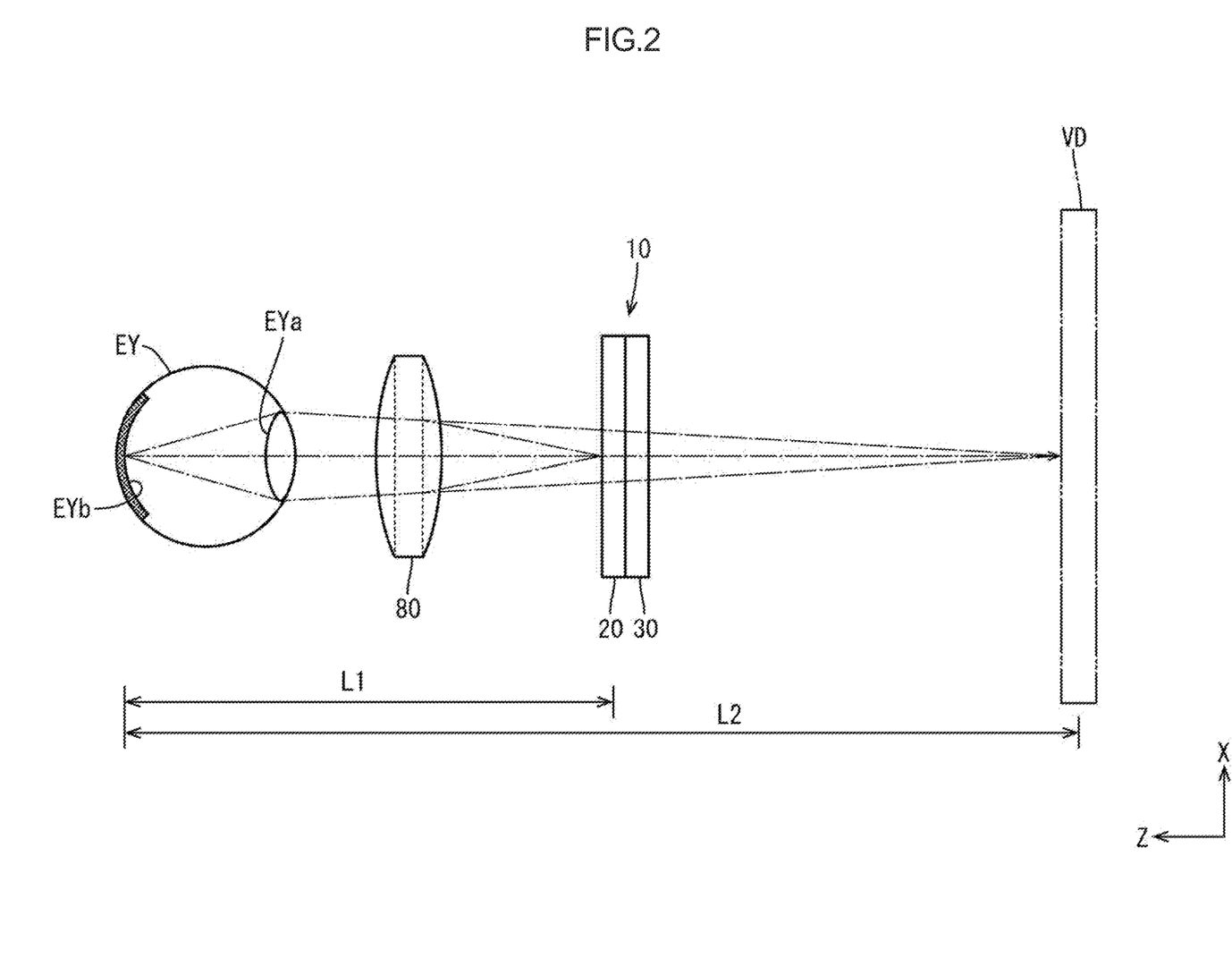
FIG. 2 is a side view of the optical relationship between a liquid crystal panel, lens, and user's eyeball.

As illustrated in FIG. 1, the head-mounted display HMD includes a head-mounted instrument HMDa that is to be mounted onto a head HD of a user so as to cover user's both eyes. As illustrated in FIG. 2, the head-mounted instrument HMDa has, inside, at least the liquid crystal display 10 that displays an image, and a lens 80 that forms the image displayed on the liquid crystal display 10 onto an eyeball (i.e., eye) EY of the user. The liquid crystal display 10 includes two liquid crystal panels (i.e., an example of a display panel) 20 each having a rectangular shape in plan view, and includes two backlight devices 30 each of which has a light source and casts, to the corresponding liquid crystal panel 20, light for use in image display. The liquid crystal display 10 displays a left-eye image onto a first liquid crystal panel 20A, and displays a right-eye image onto a second liquid crystal panel 20B. In other words, the head-mounted display HMD in the present preferred embodiment is a binocular display, with the two liquid crystal panels 20 provided for the respective right and left eyes. This configuration facilitates, for instance, positioning between the liquid crystal panels 20 and the eyes. Hereinafter, a left-eye member and a right-eye member, when distinguished from each other, will be accompanied with indexes A and B along with their reference numbers (e.g., the first liquid crystal panel 20A and the second liquid crystal panel 20B); in addition, these members, when not distinguished from each other, will not be accompanied with the indexes A and B along with their reference numbers (e.g., the liquid crystal panel 20).

As illustrated in FIG. 2, the lens 80 is interposed between the liquid crystal panel 20 and the user's eyeball EY, and refracts transmitted light. Adjusting the focal distance of the lens 80 allows the user to recognize an image formed on a retina (i.e., eye) EYb of the eyeball EY via a crystalline lens EYa of the eyeball EY, in such a manner that this image is displayed on a virtual display VD apparently disposed in a location away from the eyeball EY by a distance L2 that is much distant than the actual distance, i.e., a distance L1 from the eyeball EY to the liquid crystal panel 20. The user consequently views an enlarged image (i.e., virtual image) displayed on the virtual display VD having a screen size much greater (e.g., about from several tens of inches to several hundreds of inches) than the screen size of the liquid crystal panel 20 (e.g., about from zero point several inches to several inches). The images displayed on the respective liquid crystal panels 20A and 20B are formed onto the respective left and right eyes through a first lens 80A and second lens 80B respectively provided for the liquid crystal panels 20A and 20B. The images formed are combined as an observed image of both eyes and thus viewed by the user. Herein, the head-mounted instrument HMDa also includes, but not limited to, earphones that are fitted into the user's ears and thus output a sound.

Figure 3:
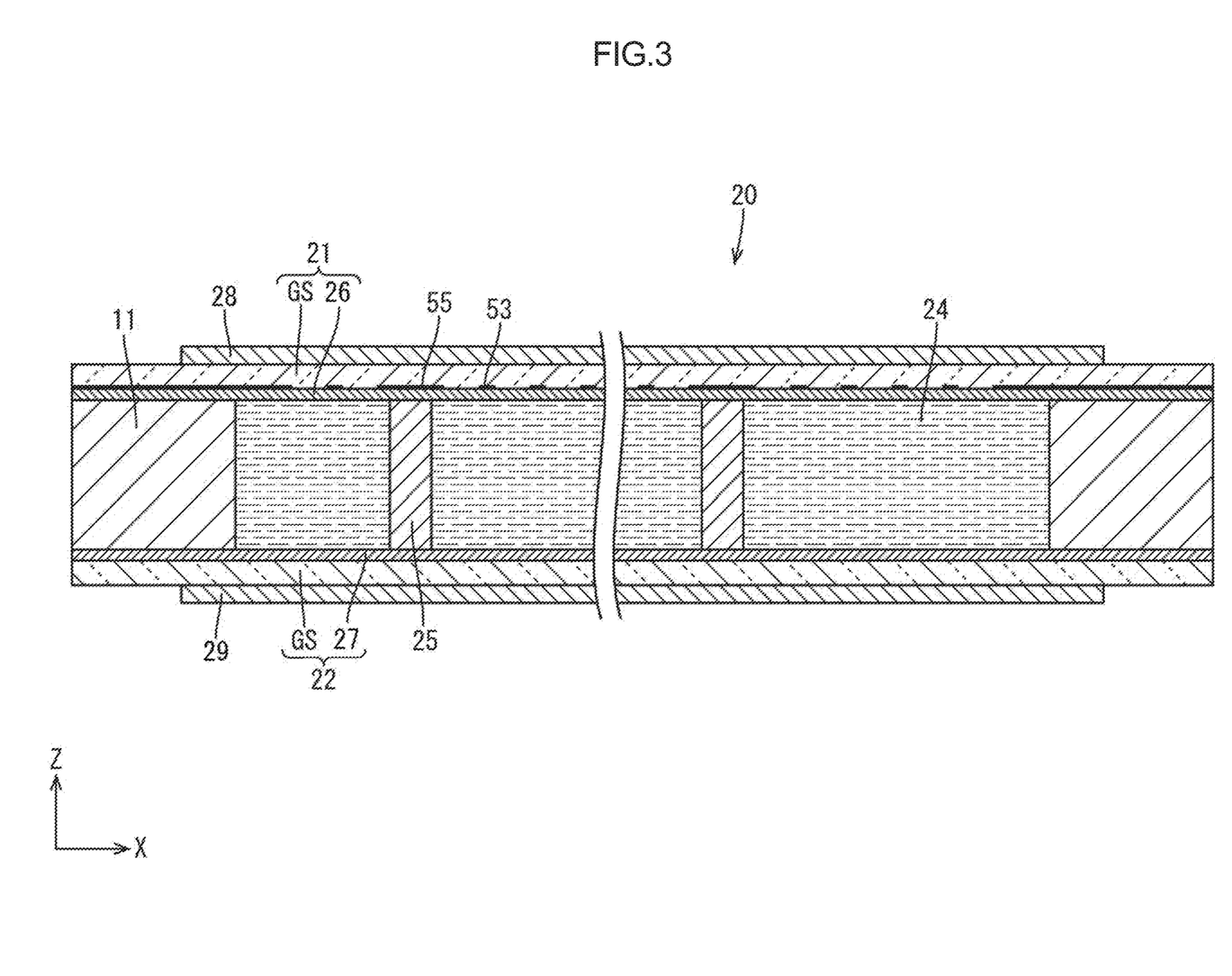
FIG. 3 is a cross-sectional view of the liquid crystal panel.

The following details the configuration of the liquid crystal panel 20. As illustrated in FIG. 3, the liquid crystal panel 20 includes a pair of substrates 21 and 22, and a liquid crystal layer 24. The liquid crystal layer 24 contains liquid crystal molecules that change their optical properties upon electric-field application. The substrates 21 and 22 are joined together with a sealant 11 while maintaining a cell gap as thick as the liquid crystal layer 24. The liquid crystal layer 24 is sandwiched and supported in the inner space between the substrates 21 and 22. Each of the substrate 21 and 22 includes a glass substrate GS that is almost transparent. Each glass substrate GS has an inner surface on which multiple films (i.e., multi-layer film) 26 and 27 are laminated through a known method, such as photolithography. One of the substrates 21 and 22 is a CF substrate (i.e., counter substrate), which is a front substrate (i.e., a substrate adjacent to the lens 80), and the other is an array substrate (i.e., active-matrix substrate) 22, which is a back substrate (i.e., a substrate adjacent to the backlight device 30). The substrate 21 has an outer surface on which a polarizer plate 28 is attached. In addition, the substrate 22 has an outer surface on which a polarizer plate 29 is attached.

As illustrated in FIG. 3, disposed between the substrates 21 and 22 are columnar spacers 25 extending through the liquid crystal layer 24. The columnar spacers 25 keep the interval (i.e., cell gap) between the substrates constant throughout the plane. The spacers 25 are made of, for instance, a photosensitive resin material that is almost transparent, and are formed on the CF substrate 21 during a manufacturing step through photolithography, which is a known method. Since the spacers 25 are almost transparent, the multi-layer film 26 of the CF substrate 21 has, in its inside, spacer lightproof portions 55 for avoiding light leakage from the locations where the spacers 25 are disposed. The spacer lightproof portions 55 are placed over the spacers 25 in plan view. The spacer lightproof portions 55 are made of a lightproof material, such as titanium or black resin. In use for the head-mounted display HMD, one or more spacers 25 are preferably provided per several tens of pixels, that is, per several tens of colored pixels (i.e., sub-pixels), which are described later on. Each spacer lightproof portion 55 is provided for the corresponding spacer 25.

Figure 4:
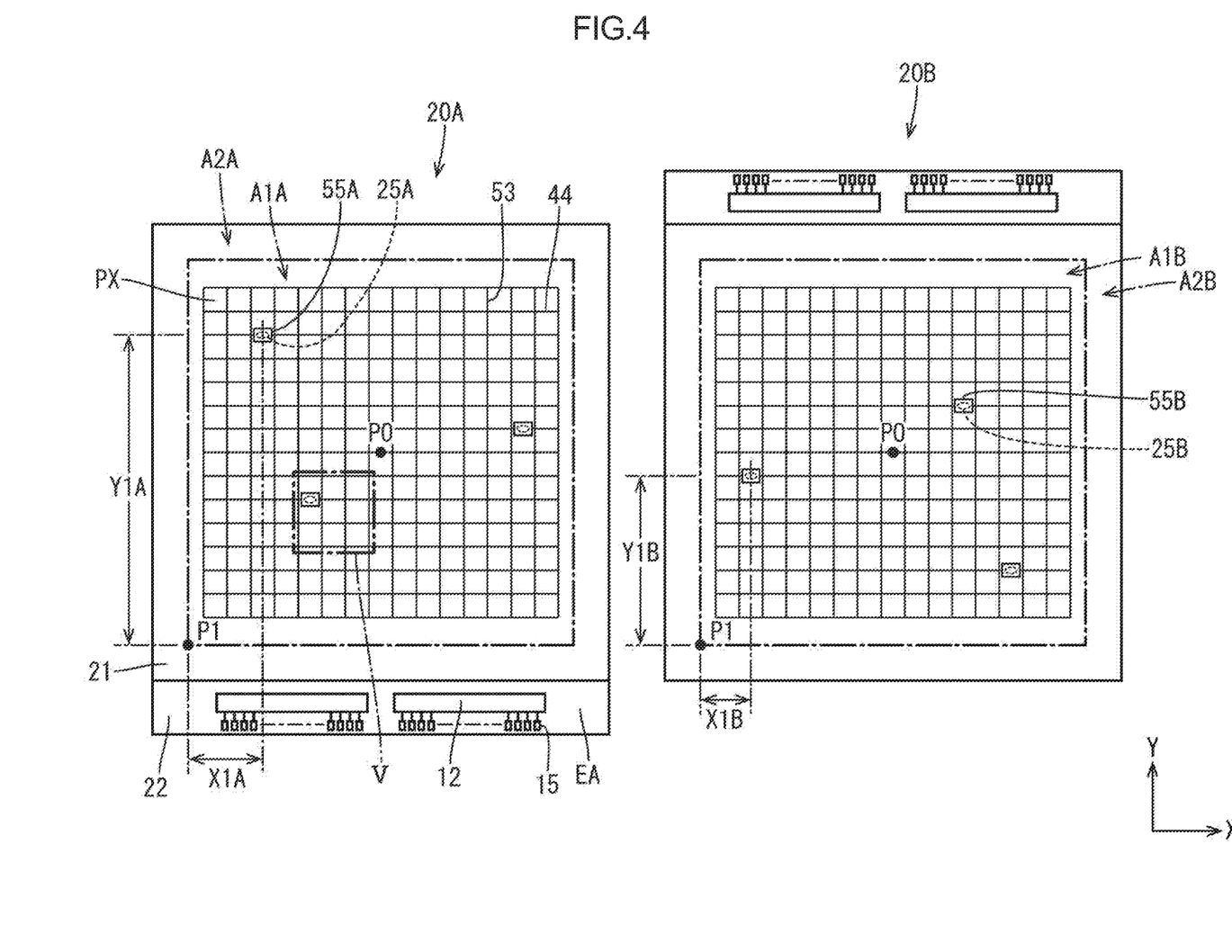
FIG. 4 is a plan view of first and second liquid crystal panels according to the first preferred embodiment.

FIG. 4 is a plan view of the liquid crystal panels 20A and 20B viewed from the lens 80 (by extension, from the eyeball EY). The first liquid crystal panel 20A and second liquid crystal panel 20B are arranged in parallel as illustrated in FIG. 4. Liquid crystal panels designed in the same way are used for the first liquid crystal panel 20A and second liquid crystal panel 20B. As illustrated in FIG. 4, the second liquid crystal panel 20B coincides with the first liquid crystal panel 20A flipped vertically. Here, the wording "flipping the first liquid crystal panel 20A vertically" means making a half-turn about a rotation axis that passes through a point P0, the center of a region where the CF substrate 21 and array substrate 22 overlap each other, and that extends in the normal direction of both substrates 21 and 22. The wording "flipping the first liquid crystal panel 20A vertically" means moving the upper part of the liquid crystal panel 20 in plan view to the lower part of the same. The following details each component of the liquid crystal panel 20.

As illustrated in FIG. 4, the array substrate 22 has sides in the Y-axis direction that are longer than those of the CF substrate 21, and has a portion EA that is not placed over the CF substrate 21 after joint and is thus exposed. On this exposed portion EA of the array substrate 22, drivers 12 are mounted through chip-on-glass (COG), and terminals 15 are provided. The drivers 12 are electronic components for driving the liquid crystal panel 20. The terminals 15 are used for external connection. Each terminal 15 is connected to the corresponding driver 12 via wires, and receives various signals from an external control substrate. These received signals are transmitted to the driver 12. As illustrated in FIG. 4, the middle in the plane of the pair of substrates 21 and 22 is a display region A1 for displaying an image. Further, the frame-shaped outer periphery of the pair of substrates 21 and 22 is a non-display region A2 surrounding the display region A1. The non-display region A2 displays no images. The plane of the substrates 21 and 22 is sectioned into these two regions. The exposed portion EA is included in the non-display region A2. Herein, the boundary between the display region A1 and non-display region A2 is denoted by dot-dashed lines in FIG. 4. An image displayed in a display region A1A of the first liquid crystal panel 20A is observed by the left eye, and an image displayed in a display region A1B of the second liquid crystal panel 20B is observed by the right eye. In other words, the display regions A1A and A1B are respectively observed by the left and right eyes.

As illustrated in FIG. 4, the multiple spacer lightproof portions 55 are distributed in the display region A1. FIG. 4 shows an instance where three spacer lightproof portions 55 are distributed irregularly. In some embodiments, the spacer lightproof portions 55 may be distributed regularly. The second liquid crystal panel 20B is disposed to coincide with the first liquid crystal panel 20A flipped vertically. Thus, the location where the spacer lightproof portions 55A in the display region A1A of the first liquid crystal panel 20A are disposed does not coincide with the location where the spacer lightproof portions 55B in the display region A1B of the second liquid crystal panel 20B are disposed. To be specific, let the lower-left corner of the display region A1 in plan view be a base point P1 of the display region A1; in addition, let the location where each spacer lightproof portion 55 is disposed be expressed as (X1, Y1), where X1 indicates the distance in the X-axis direction from the base point P1, where Y1 indicates the distance in the Y-axis direction from the base point P1. Accordingly, the location where the spacer lightproof portion 55A of the first liquid crystal panel 20A is disposed (expressed as X1A, Y1A) does not coincide with the location where the spacer lightproof portion 55B of the second liquid crystal panel 20B is disposed (expressed as X1B, Y1B). Consequently, the location where the spacer lightproof portion 55A is disposed, that is, an observed location observed by the left eye, does not coincide with the location where the spacer lightproof portion 55B is disposed, that is, an observed location observed by the right eye. When the user combines observation images of both eyes together, the observed locations of the spacer lightproof portions 55A and 55B hence misalign and is thus less visible (or inconspicuous).

Figure 5:
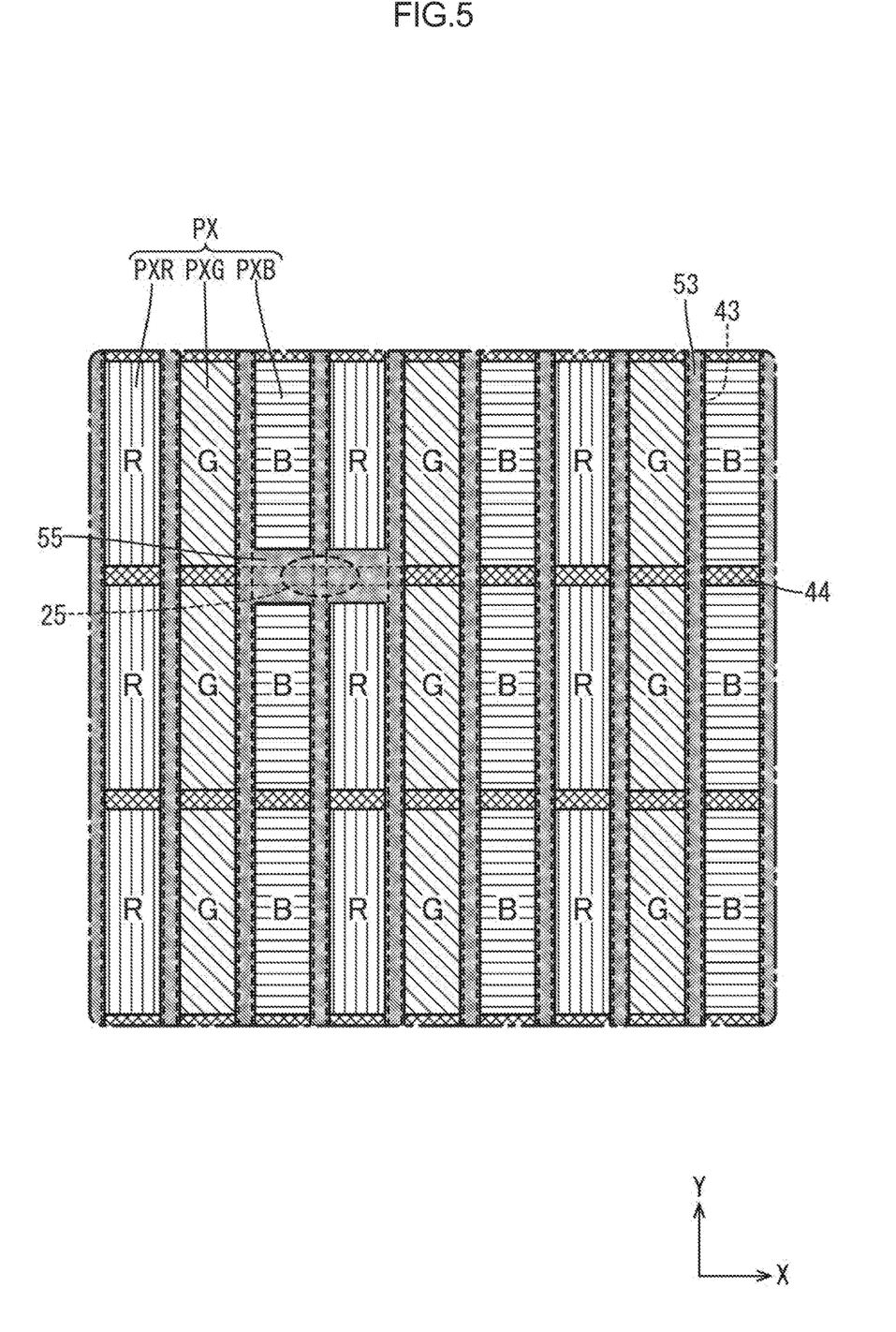
FIG. 5 is an enlarged plan view of a frame section V denoted by dot-dashed lines in FIG. 4.

As illustrated in FIG. 5, an enlarged view of a frame section V denoted by dot-dashed lines in FIG. 4, arranged in the display region A1 on the array substrate 22 are multiple source lines (i.e., source bus lines or data lines) 43 and multiple gate lines (i.e., gate bus lines or scanning lines) 44. The source lines and gate lines intersect one another in the form of a lattice. The source lines 43 and gate lines 44 each consist of a monolayer film of metal, such as copper (Cu), or of an alloy of the metal, or consist of a laminated film of the same. Each region defined by the source lines 43 in the Y-axis direction and by the gate lines 44 in the X-axis direction has a switching element (e.g., thin film transistor or TFT for short), and a pixel electrode that is made of a transparent conductive material, such as an indium tin oxide (ITO). Signal input from the source lines 43 and gate lines 44 to the switching element changes the potential of the pixel electrode connected to the switching element. The potential of the pixel electrode controls an electric field that is applied to the liquid crystal layer 24, thus switching the alignment of the liquid crystal molecules properly to drive the liquid crystal panel 20. Here, the source lines 43, gate lines 44, switching elements, pixel electrodes, and other components are formed by various films patterned in the array substrate 22. Reference is made to the CF substrate 21. Arranged in matrix are color filters in parallel in a location where the color filter s are placed over the pixel electrodes on the array substrate 22 in plan view. The color filters each consist of colored portions having colors different from each other: red (R), green (G), and blue (B).

As illustrated in FIG. 5, the liquid crystal panel 20 has display pixels PX each of which is a display unit. The single display pixel PX consists, in a set, of colored portions having three colors: red (R), green (G), and blue (B), and of three pixel electrodes that face these colored portions. The display pixel PX consists of three colored pixels (i.e. sub-pixels): a red pixel PXR having a colored portion of R, a green pixel PXG having a colored portion of G, and a blue pixel PXB having a colored portion of B. The colored pixels PXR, PXG, and PXB are arranged repeatedly in rows (i.e., the X-axis direction) in the plane of the liquid crystal panel 20, thus forming pixel groups. These multiple pixel groups are arranged in columns (i.e., the Y-axis direction). Although FIG. 4 representatively illustrates that first lightproof portions 53 placed over the source lines 43 are located at the boundaries between the display pixels PX, these first lightproof portions 53 are actually disposed at the boundaries between the colored pixels PXR, PXG, and PXB as illustrated in FIG. 5.

As illustrated in FIGS. 3 and 5, the first lightproof portions (i.e., a black matrix) 53 for avoiding color mixture are disposed between the colored portions on the CF substrate 21. The first lightproof portions 53 are made of a lightproof material, such as titanium (Ti) or black resin. The first lightproof portions 53 are arranged linearly in the Y-axis direction so as to be, in plan view, placed over the source lines 43, disposed on the array substrate 22. The first lightproof portions 53 are wider than the source lines 43 in order to avoid misalignments with the source lines 43. As illustrated in FIGS. 4 and 5, the spacer lightproof portions 55 are placed over the gate lines 44 in plan view. The spacer lightproof portions 55 are larger in appearance than the spacers 25 in plan view for avoiding misalignments with the spacers 25 and other reasons. Take FIG. 5 for instance. Each colored pixel is 10 μm (in the X-axis direction)×30 μm. (in the Y-axis direction) large, and each spacer 25 is horizontally elliptic in plan view and is 10μ, in diameter in its shorter-side direction (i.e., Y-axis direction). In contrast, each spacer lightproof portion 55 is larger in appearance than these sizes in the Y-axis direction by several micrometers.

Figure 6:
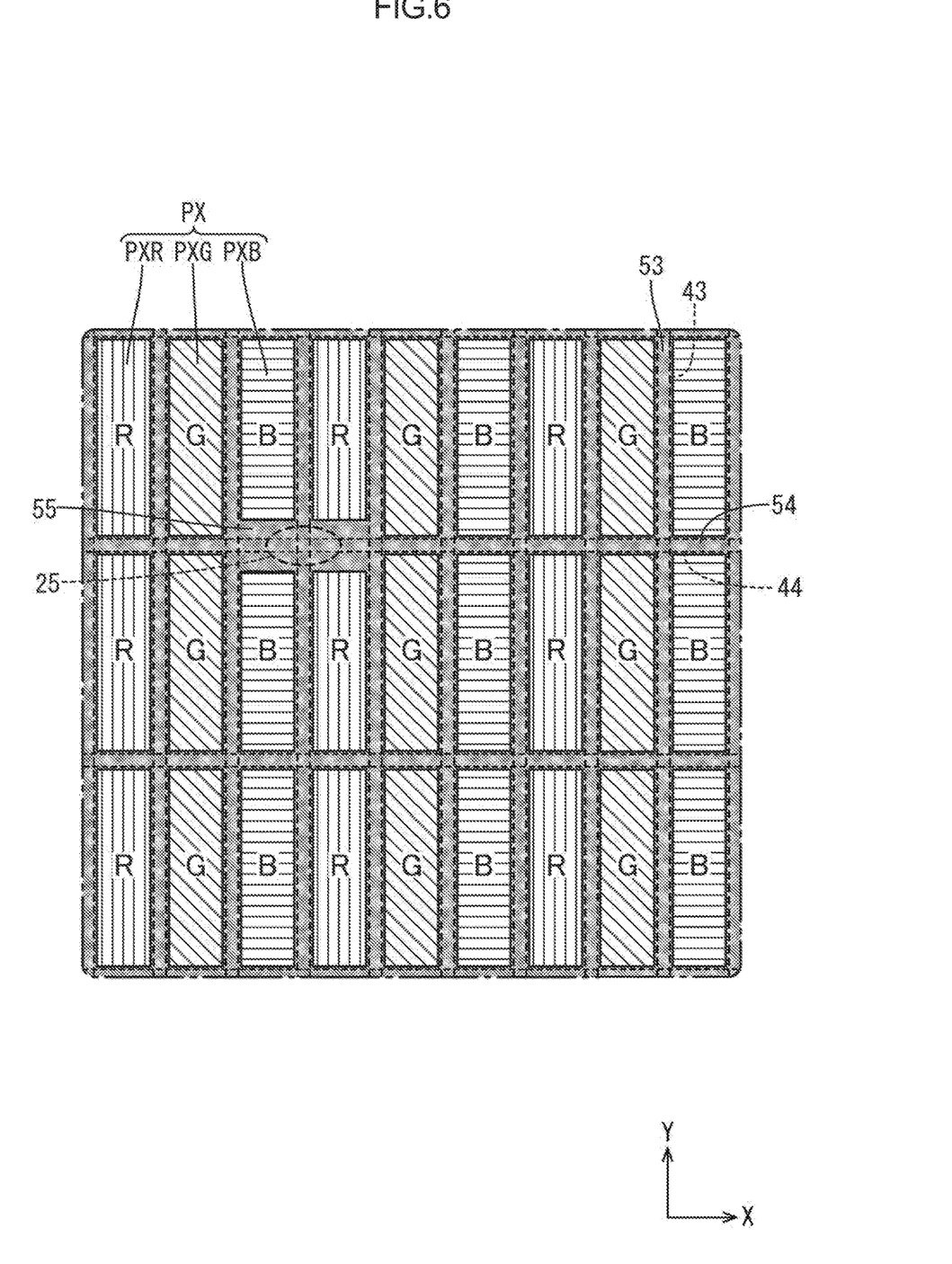
FIG. 6 is an enlarged plan view of the frame section V, denoted by dot-dashed lines in FIG. 4; the frame section V is part of a liquid crystal panel according to a first modification.

It is noted that in addition to the first lightproof portions 53, second lightproof portions (i.e., a black matrix) 54 may be provided to be placed over the gate lines 44 in plan view, as described in a first modification with reference to FIG. 6. Although the gate lines 44, which are made of a metal material, are lightproof to a certain degree, the second lightproof portions 54 made of a lightproof material, such as titanium (Ti), can enhance a capability of blocking out light, thereby achieving independent display between the colored pixels PXR of the same color, between the colored pixels PXG of the same color, and between the colored pixels PXB of the same color. Here, the second lightproof portions 54 are not provided in the first preferred embodiment, described with reference to FIG. 5; thus, the aperture ratio in the first preferred embodiment is higher than that in the first modification, which is described with reference to FIG. 6.

As described above, the liquid crystal display 10 for the head-mounted display HMD according to the present preferred embodiment includes the first liquid crystal panel 20A and second liquid crystal panel 20B arranged in parallel. Each of the first display panel 20A and second display panel 20B includes the following: the pair of substrates 21 and 22 having a plane sectioned into the display region A1 and non-display region A2; and the spacer 25 interposed between the pair of substrates 21 and 22, the spacer 25 being columnar. The CF substrate 21 includes the spacer lightproof portion 55 placed over the spacer 25. The first display panel 20A and the second display panel 20B do not coincide with each other with regard to a location where the spacer lightproof portion 55 in the display region A1 is disposed.

Consequently, when the user wears the head-mounted display HMD, with the first liquid crystal panel 20A on his/her left eye and with the second liquid crystal panel 20B on his/her right eye, and then combines together images observed by both eyes, the location where the spacer lightproof portion 55A is disposed (i.e., observed location), observed by the left eye, and the location where the spacer lightproof portion 55B is disposed (i.e., observed location), observed by the right eye, do not coincide with each other, thus producing a misalignment. As a result, when the user combines the observed images of both eyes together, the observed locations in the spacer lightproof portions 55A and 55B are less visible. In some cases by contrast, the location where the spacer lightproof portion 55A in the display region A1 of the first display panel 20A is disposed can coincide with the location where the spacer lightproof portion 55B in the display region A1 of the second display panel 20B is disposed. Accordingly, when the observed images of both eyes are combined together, the observed locations of the spacer lightproof portions 55A and 55B coincide with each other and are thus superposed, thereby tending to be visible.

In the present preferred embodiment, no lightproof portions as large as the spacer lightproof portion 55 are provided for pixels without spacers, unlike the conventional technique. This configuration eliminates a decrease in the aperture ratio of the entire liquid crystal panel 20, thereby enhancing the brightness of the liquid crystal display 10. This configuration also eliminates the need for increasing the amount of light emission of the light source to avoid brightness degradation, thereby preventing increase in the power consumption of the light source.

The second liquid crystal panel 20B is disposed in parallel to the first liquid crystal panel 20A so as to coincide with the first liquid crystal panel 20A flipped vertically. Doing so facilitates achievement of a configuration where the first liquid crystal panel 20A and the second liquid crystal panel 20B do not coincide with each other with regard to the location where the spacer lightproof portion 55 in the display region A1 is disposed. The first liquid crystal panel 20A and the second liquid crystal panel 20B do not need to be produced separately during a manufacturing step, in order that the two liquid crystal panels 20A and 20B do not coincide with each other with regard to the location where the spacer lightproof portion 55 in the display region A1 is disposed. In arrangement in parallel, one of the first liquid crystal panel 20A and second liquid crystal panel 20B is flipped vertically. This arrangement facilitates manufacture.

Second Preferred Embodiment

Figure 7:
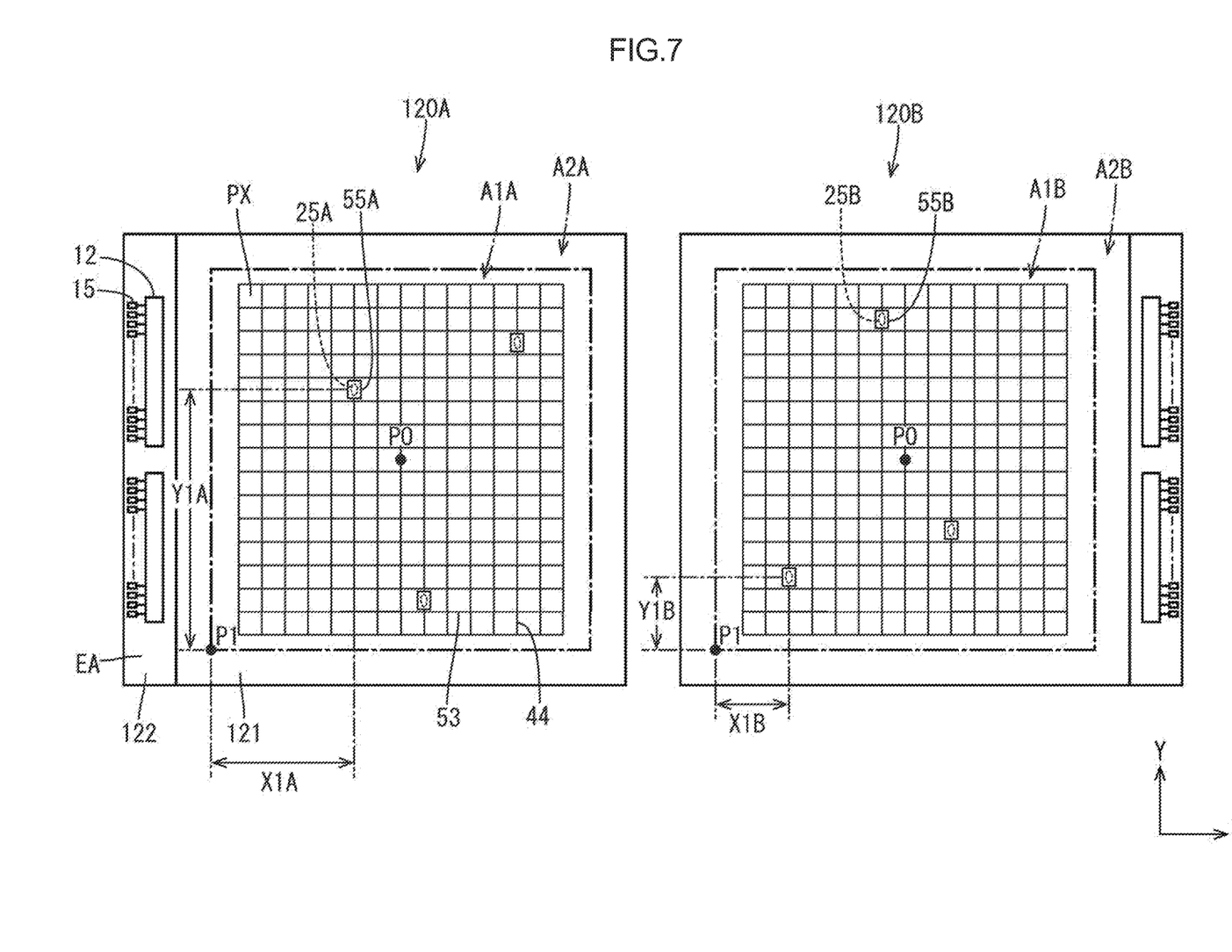
FIG. 7 is a plan view of first and second liquid crystal panels according to a second preferred embodiment.

FIG. 7 illustrates a first liquid crystal panel 120A and a second liquid crystal panel 120B according to a second preferred embodiment. The second preferred embodiment is different from the first preferred embodiment in that the second liquid crystal panel 120B is disposed in parallel to the first liquid crystal panel 120A so as to coincide with the first liquid crystal panel 120A flipped horizontally. Herein, the wording "flipping the first liquid crystal panel 120A horizontally" means making a half-turn about a rotation axis that passes through the point P0, the center of a region where a CF substrate 121 and an array substrate 122 overlap each other, and that extends in the normal direction of both substrates 121 and 122. The wording "flipping the first liquid crystal panel 120A horizontally" means moving the left part of a liquid crystal panel 120 in plan view to the right. In the second preferred embodiment, components, actions, and effects that are the same as those in the first preferred embodiment will not be elaborated upon.

Like the first preferred embodiment, the second preferred embodiment facilitates achievement of a configuration where the first liquid crystal panel 120A and the second liquid crystal panel 120B do not coincide with each other with regard to the location where the spacer lightproof portion 55 in the display region A1 is disposed. The first liquid crystal panel 120A and the second liquid crystal panel 120B do not need to be produced separately during a manufacturing step, in order that the two liquid crystal panels 120A and 120B do not coincide with each other with regard to the location where the spacer lightproof portion 55 in the display region A1 is disposed. Moreover, in arrangement in parallel, one of the first liquid crystal panel 120A and second liquid crystal panel 120B is flipped horizontally. This arrangement facilitates manufacture.

Third Preferred Embodiment

Figure 8:
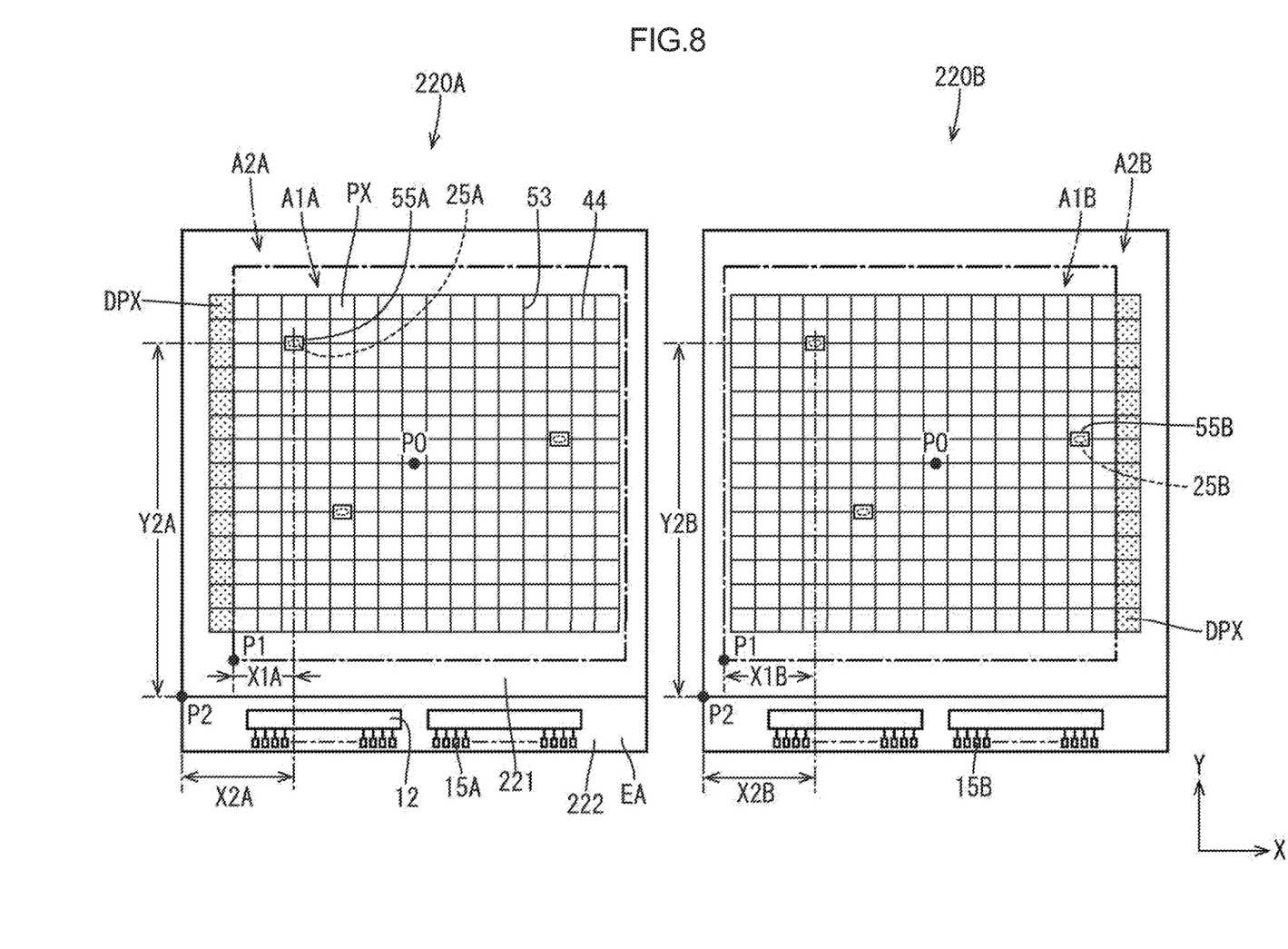
FIG. 8 is a plan view of first and second liquid crystal panels according to a third preferred embodiment.

FIG. 8 illustrates a first liquid crystal panel 220A and a second liquid crystal panel 220B according to a third preferred embodiment. Unlike the first and second preferred embodiments, the second liquid crystal panel 220B does not coincide with the first liquid crystal panel 220A flipped vertically or horizontally. In the third preferred embodiment, components, actions, and effects that are the same as those in the first and second preferred embodiments will not be elaborated upon.

In the present preferred embodiment, the first liquid crystal panel 220A and second liquid crystal panel 220B coincide with each other with regard to the location where the spacer lightproof portion 55 in substrates 221 and 222 is disposed, as illustrated in FIG. 8. More specifically, let the lower-left corner of a region in plan view where the substrates 221 and 222 overlap each other be a base point P2 of the substrates; in addition, let the location where each spacer lightproof portion 55 is disposed be expressed as (X2, Y2), where X2 indicates the distance in the X-axis direction from the base point P2, where Y2 indicates the distance in the Y-axis direction from the base point P2. Accordingly, the location where the spacer lightproof portion 55A of the first liquid crystal panel 220A is disposed (expressed as X2A, Y2A) coincides with the location where the spacer lightproof portion 55B of the second liquid crystal panel 220B is disposed (expressed as X2B, Y2B).

In the present preferred embodiment, the lighting state of the display pixels PX of the first liquid crystal panel 220A and second liquid crystal panel 220B is adjusted in such a manner that the first liquid crystal panel 220A and second liquid crystal panel 220B do not coincide with each other with regard to the range of the display region A1 in the substrates 221 and 222. More specifically, the lighting state of the display pixel PX in the first liquid crystal panel 220A is adjusted in such a manner that the range of the display region A1A of the first liquid crystal panel 220A shifts toward the second liquid crystal panel 220B (i.e., toward the right side of FIG. 8); in addition, the lighting state of the display pixel PX in the second liquid crystal panel 220B is adjusted in such a manner that the range of the display region A1B of the second liquid crystal panel 220B shifts toward the first liquid crystal panel 220A (i.e., toward the left side of FIG. 8).

To be specific, the lighting state of the multiple display pixels PX is adjusted in such a manner that some of the display pixels PX serve as dummy pixels DPX that always fail to light up, in order to shift the range of the display region A1 (or non-display region A2). The dummy pixels DPX, which are produced in a manner similar to the other display pixels PX, are adjusted in such a manner that the switching elements contained in the dummy pixels DPX are turned always-off in response to a signal transmitted from an external control substrate and the drivers 12, thus causing the dummy pixels DPX to always fail to light up. The dummy pixels DPX, which fail to light up, are part of the non-display region A2. Selectively providing the display pixels PX that serve as the dummy pixels DPX can shift the range of the non-display region A2. For instance, FIG. 8 illustrates that the display pixels PX on the left side (i.e., a side distant from the second liquid crystal panel 220B) of the first liquid crystal panel 220A are provided as the dummy pixels DPX, thereby widening the range of the non-display region A2A toward the left, so that the range of the non-display region A2A has shifted toward the left (or the range of the display region A1A has shifted toward the right). FIG. 8 also illustrates that the display pixels PX on the right side (i.e., a side distant from the first liquid crystal panel 220A) of the second liquid crystal panel 220B are provided as the dummy pixels DPX, thus widening the range of the non-display region A2B toward the right, so that the range of the non-display region A2B shifts toward the right (or the range of the display region A1B shifts toward the left). Here, FIG. 8 illustrates an instance where more display pixels PX are provided in advance than those in the first preferred embodiment (c.f., FIG. 4) and in the second preferred embodiment (c.f., FIG. 7) so that providing the dummy pixels DPX does not merely enlarge the non-display region A2 (or shrinks the display region A1).

Doing so provides a configuration where the first liquid crystal panel 220A and second liquid crystal panel 220B do not coincide with each other with regard to the range of the display region A1 in the substrates 221 and 222, and consequently provides a configuration where the first liquid crystal panel 220A and second liquid crystal panel 220B do not coincide with each other with regard to the location where the spacer lightproof portion 55 in the display region A1 is disposed. To be specific, a comparison with regard to the distance X1 in the X-axis direction from the base point P1 of the display region A1 is made between both spacer lightproof portions 55A and 55B. Accordingly, the distance X1A in the first liquid crystal panel 220A does not coincide with the distance X1B in the second liquid crystal panel 220B. Consequently, the location where the spacer lightproof portion 55A is disposed (i.e., observed location), observed by the left eye, and the location where the spacer lightproof portion 55B is disposed (i.e., observed location), observed by the right eye, do not coincide with each other, thus producing a misalignment. As a result, when the user combines the observed images of both eyes together, the observed locations in the spacer lightproof portions 55A and 55B are less visible.

Doing so also eliminates the need for separately producing the liquid crystal panels 220A and 220B during a manufacturing step in order that the two liquid crystal panels 220A and 220B do not coincide with each other with regard to the location where the spacer lightproof portion 55 in the display region A1 is disposed. This facilitates manufacture. In addition, unlike the first and second preferred embodiments, the third preferred embodiment eliminates the need for flipping the second liquid crystal panel 220B vertically or horizontally, thereby enabling a terminal 15A of the liquid crystal panel 220A and a terminal 15B of the liquid crystal panel 220B to be adjacent to each other. For instance, FIG. 8 illustrates that the terminals 15A and 15B are respectively disposed in the lower parts of the non-display regions A2A and A2B in plan view so as to be adjacent to each other. In installing the display device into the head-mounted instrument HMDa, doing so simplifies wiring structure, thereby facilitating downsizing of the head-mounted instrument HMDa.

It is noted that the dummy pixels DPX, although disposed on the right side of the first liquid crystal panel 220A and on the left side of the second liquid crystal panel 220B by way of example only, may be disposed in any location. The dummy pixels DPX need to be provided as necessary in such a manner that the first liquid crystal panel 220A and second liquid crystal panel 220B do not coincide with each other with regard to the range of the display region A1 in the substrates 221 and 222; for instance, the dummy pixels DPX may be disposed in the upper part of the first liquid crystal panel 220A and in the lower part of the second liquid crystal panel 220B.

Fourth Preferred Embodiment

Figure 9:
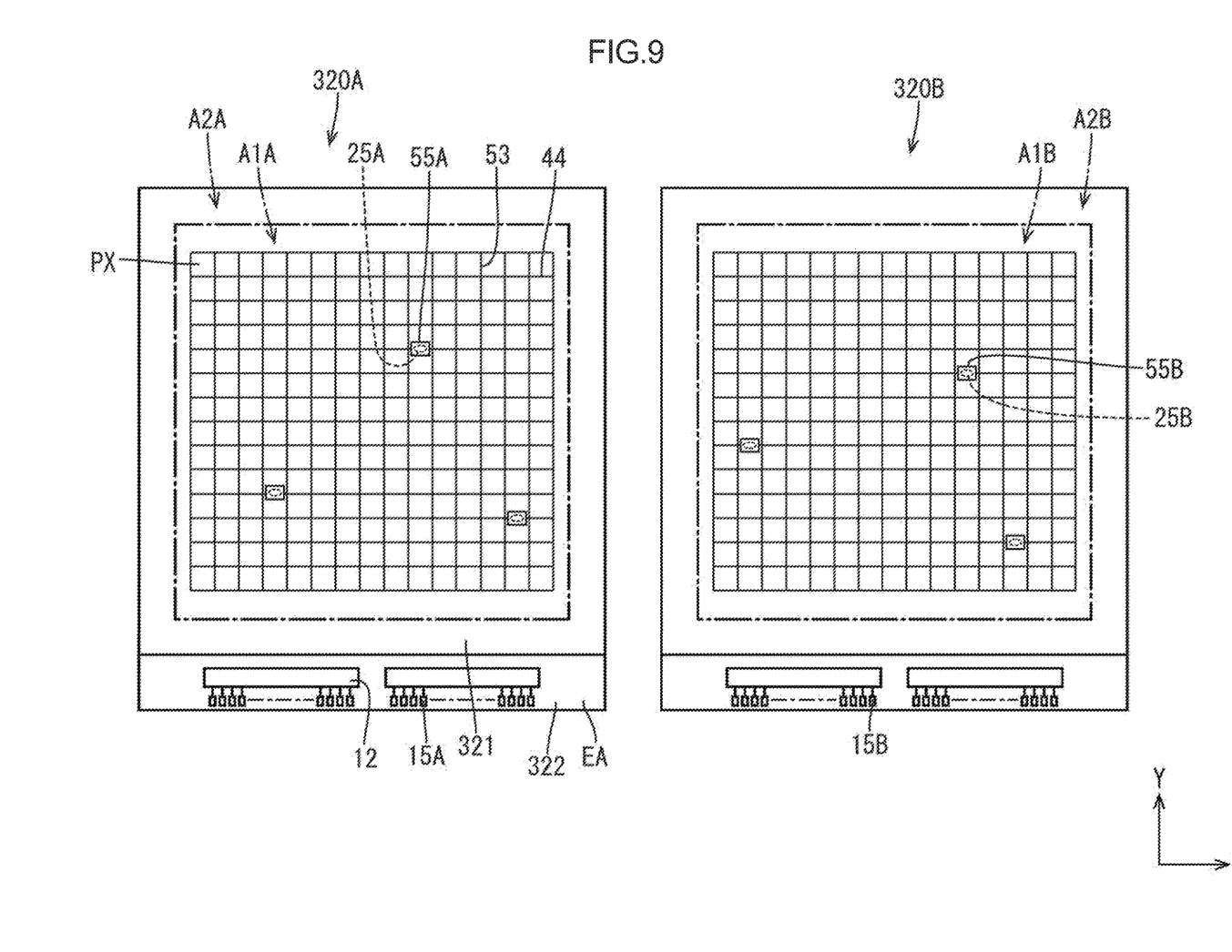
FIG. 9 is a plan view of first and second liquid crystal panels according to a fourth preferred embodiment.

FIG. 9 illustrates a first liquid crystal panel 320A and a second liquid crystal panel 320B according to a fourth preferred embodiment. Unlike the first and second preferred embodiments, the second liquid crystal panel 320B does not coincide with the first liquid crystal panel 320A flipped vertically or horizontally. In addition, unlike the third preferred embodiment, the first liquid crystal panel 320A and second liquid crystal panel 320B do not coincide with each other with regard to the location where the spacer lightproof portion 55 in substrates 321 and 322 is disposed. In the fourth preferred embodiment, components, actions, and effects that are the same as those in the first to third preferred embodiments will not be elaborated upon.

The first liquid crystal panel 320A and second liquid crystal panel 320B are produced in design manners different from each other so that the first liquid crystal panel 320A and second liquid crystal panel 320B do not coincided with each other with regard to the location where the spacer lightproof portion 55 in the substrates 321 and 322 is disposed, as illustrated in FIG. 9. Doing so provides a configuration where the first liquid crystal panel 320A and second liquid crystal panel 320B do not coincide with each other with regard to the location where the spacer lightproof portion 55 in the display region A1 is disposed. Consequently, the location where the spacer lightproof portion 55A is disposed (i.e., observed location), observed by the left eye, and the location where the spacer lightproof portion 55B is disposed (i.e., observed location), observed by the right eye, do not coincide with each other, thus producing a misalignment. As a result, when the user combines the observed images of both eyes together, the observed locations in the spacer lightproof portions 55A and 55B are less visible. Like the third preferred embodiment, doing so also enables the terminal 15A of the first liquid crystal panel 320A and the terminal 15B of the second liquid crystal panel 320B to be adjacent to each other. In installing the display device into the head-mounted instrument HMDa, this arrangement simplifies wiring structure, thereby facilitating downsizing of the head-mounted instrument HMDa.

OTHER PREFERRED EMBODIMENTS

The present invention is not limited to the foregoing preferred embodiments and drawings. For instance, preferred embodiments below are also encompassed within the technical scope of the present invention.

(1) Although the foregoing preferred embodiments have described an instance where the spacer lightproof portion is placed over the gate line, the spacer lightproof portion may be placed over the source line.

(2) Although the foregoing preferred embodiments have described an instance where the display pixel includes multiple colored pixels having colored portions of R, G, and B, the number of colors for the colored portions and their combinations can be changed as necessary; for instance, the display pixel may consist of a single colored pixel having a single color.

(3) Although the first and second preferred embodiments have described an instance where no dummy pixels are provided, dummy pixels may be provided, and liquid crystal panels may be arranged in parallel in such a manner that one of the liquid crystal panels is flipped vertically or horizontally, as descried in the third preferred embodiment.

REFERENCE SIGNS LIST 10 liquid crystal display (an example of a display device), 15, 15A, 15B terminal, 20, 120, 220, 320 liquid crystal panel (display panel), 20A, 120A, 220A, 320A first liquid crystal panel (first display panel), 20B, 120B, 220B, 320B second liquid crystal panel (second display panel), 21, 22, 121, 122, 221, 222, 321, 322 substrate, 24 liquid crystal layer, 25, 25A, 25B spacer, 55, 55A, 55B spacer lightproof portion, 80A first lens, 80B second lens, A1, A1A, A1B display region, A2, A2A, A2B non-display region, DPX dummy pixel, HMD head-mounted display, HMDa head-mounted instrument, PX display pixel

What is claimed is:

1. A display device for a head-mounted display, comprising
a first display panel and a second display panel that are arranged in parallel,
wherein each of the first display panel and the second display panel comprises
a pair of substrates comprising a plane sectioned into a display region and a non-display region, and
a spacer interposed between the pair of substrates, the spacer being columnar,
the pair of substrates comprising a spacer lightproof portion placed over the spacer,
the first display panel has a plurality of red pixels, a plurality of green pixels, and a plurality of blue pixels, and displays a left-eye image,
the second display panel has a plurality of red pixels, a plurality of green pixels, and a plurality of blue pixels, and displays a right-eye image, and
where the spacer lightproof portion in the display region of the first display panel is disposed and where the spacer lightproof portion in the display region of the second display panel is disposed are shifted from each other.

2. The display device according to claim 1, wherein the second display panel is disposed in parallel to the first display panel so as to coincide with the first display panel flipped vertically or horizontally.

3. The display device according to claim 1, wherein
the first display panel and the second display panel coincide with each other with regard to the location where the spacer lightproof portion in the pair of substrates is disposed, and
at least one of the first display panel and the second display panel comprises a display pixel whose lighting state is adjusted in such a manner that the first display panel and the second display panel do not coincide with each other with regard to a range of the display region in the pair of substrates.

4. The display device according to claim 3, wherein the lighting state of the display pixel is adjusted in both of the first display panel and the second display panel.

5. The display device according to claim 3, wherein the display pixel comprises a dummy pixel whose lighting state is in always-off state.

6. The display device according to claim 1, wherein the first display panel and the second display panel do not coincide with each other with regard to the location where the spacer lightproof portion in the pair of substrates is disposed.

7. The display device according to claim 1, wherein
the pair of substrates comprises a terminal for external connection, and
the first display panel and the second display panel are arranged in parallel in such a manner that the terminal in the first display panel and the terminal in the second display panel are adjacent to each other.

8. The display device according to claim 1, wherein the pair of substrates sandwiches and supports a liquid crystal layer.

9. A head-mounted display comprising
a head-mounted instrument to be mounted onto a head of a user,
wherein the head-mounted instrument comprises
the display device according to claim 1,
a first lens configured to form an image displayed on the first display panel onto an eye of the user, and
a second lens configured to form an image displayed on the second display panel onto an eye of the user.

\* \* \* \* \*